Patented May 27, 1952

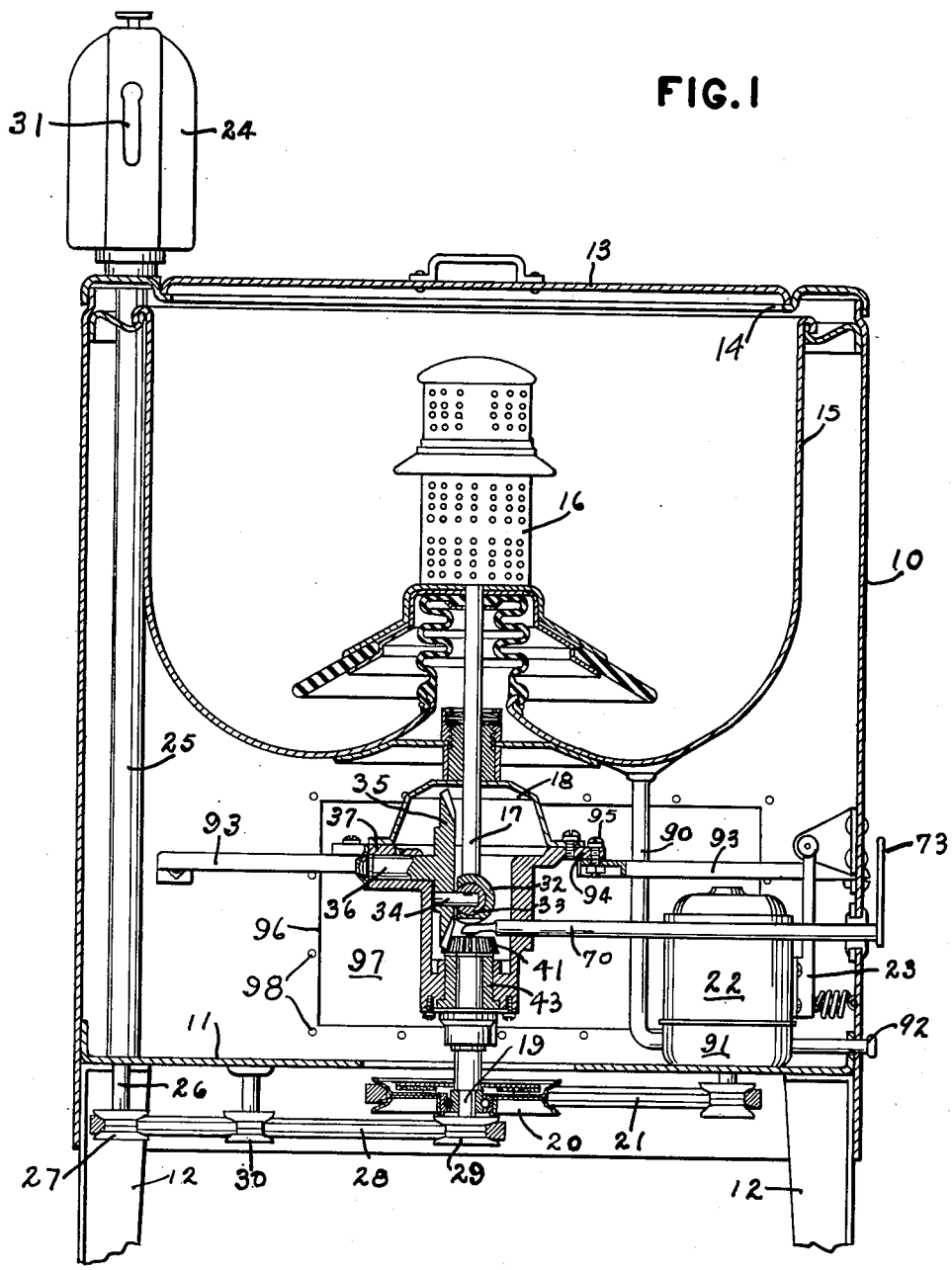

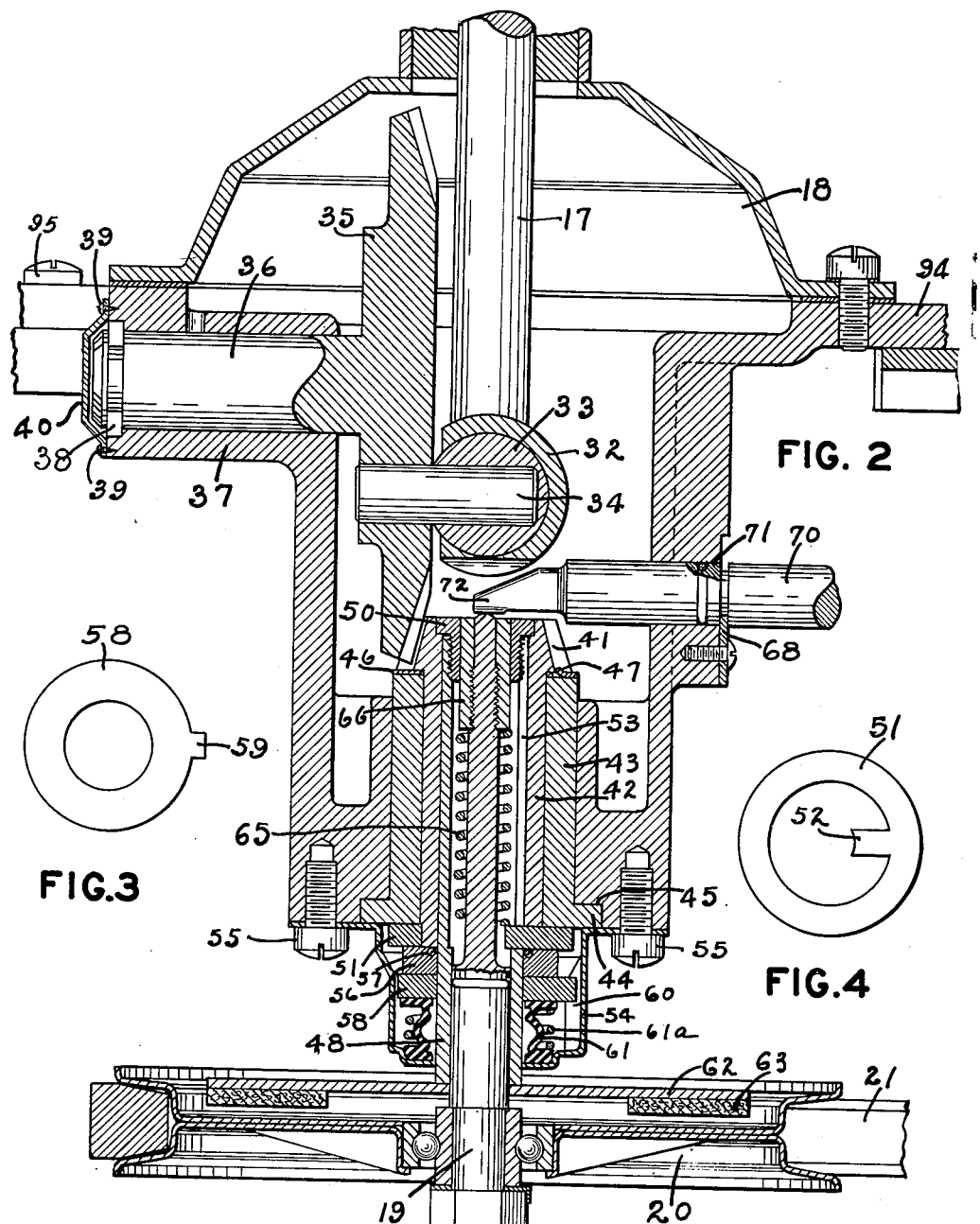

2,598,110

UNITED STATES PATENT OFFICE 2,598,110

DOMESTIC APPLIANCE DRIVE

Kendall Clark, Oakwood, Ohio, assignor to General Motors Corporation, Dayton, Ohio, a corporation of Delaware Application May 2, 1947, Serial No. 745,395

10 Claims. (Cl. 74—50)

This invention relates to domestic appliances, and more particularly to washing machines.

An object of this invention is to provide a washing machine with a simplified form of transmission for the agitator.

Another object of this invention is to provide a simplified form of transmission for imparting a reciprocatory or back and forth motion to a driven shaft from a rotary drive shaft.

Further objects and advantages of the present invention will be apparent from the following description, reference being had to the accompanying drawings, wherein a preferred form of the present invention is clearly shown.

In the drawings:

Figure 1 is a vertical cross section of a washing machine embodying features of my invention;

Figure 2 is an enlarged vertical cross section of the transmission;

Figure 3 is a plan view of a sealing washer shown in Figure 2;

Figure 4 is a plan view of the supporting washer shown in Figure 2; and

Figure 5 is an end view of the manually operated cam rod.

A washing machine, embodying features of my invention, may include a cabinet 10, which may be a sheet of metal wrapped to form a rectangular cabinet, having a bottom or base 11 with standards 12. A cover 13 may be placed over the opening 14 for access into a tub 15. An agitator 16 is placed within the tub and is adapted to have imparted thereto a back and forth movement, such as vertical reciprocation. The agitator 16 is connected to a back and forth, or reciprocable, shaft 17, extending from, and driven by, a transmission in casing 18. The transmission in casing 18 is adapted to impart a back and forth movement, or vertical reciprocation, to the shaft 17 by power derived from the rotary shaft 19. The rotary shaft 19 is provided with a pulley 20 driven by a belt 21 from a motor 22. The motor 22 is supported on a spring-drawn support 23, which automatically maintains proper tension on the belt 21.

A wringer 24, of conventional design, is pivotally mounted on the vertical support sleeve 25, and is driven by a rotatable shaft 26 having a pulley 27, driven by a belt 28 from pulley 29 on shaft 19. If necessary, the belt 28 may be provided with a resiliently drawn idler pulley 30. The operation of wringer 24 may be controlled by one or more handles 31 which are adapted to control the rotation of the wringer rolls, and to permit the swinging of the wringer about the sleeve 25, in a well-known manner.

The transmission in casing 18 may have a Scotch-yoke connection with the shaft 17. This may include a transverse, or horizontal, hollow cylinder 32 secured to the shaft 17. A slidable cylinder 33 is placed within the hollow cylinder 32, and is provided with a driving pin 34. The pin 34 is also connected to a beveled gear 35 having a horizontal shaft 36 rotating in a bearing 37 in the casing 18. The pin 34 may be fixed either to the gear 35 or cylinder 33 and has a rotatable bearing in the member to which it is not fixed. The shaft 36 may be keyed axially by a key and groove construction 38 held in place by screws 39, which pass through a combined cover and retainer 40.

A hollow beveled gear 41 meshes with the first named beveled gear 35. The gear 41 has an integral rotatable sleeve 42, which has a rotatable bearing in cylindrical bearing sleeve 43. The bearing sleeve 43 has an outward flange 44 which is seated into a recess 45 in the casing 18. A bearing ring 46 is interpositioned between the gear 41 and the end of the bearing sleeve 43, and is locked to the gear by means of an upwardly turned tongue 47. The sleeve 42 may be placed around a cooperating sleeve extension 48, and may be locked thereto by means of a combined bearing and nut 50, so that the sleeves 42 and 48 are, in effect, a single sleeve.

The sleeves 42 and 48 are locked against axial movement by means of a supporting or lock washer 51 having an inward extension 52 which, during assembly, slides longitudinally through the groove 53 in sleeve 48. A funnel 54 is secured to the casing 18 by screws 55 and holds the bearing sleeve 43 in place. A rotatable metal oil seal washer 56 is provided with a rubber-like seal 57. Another oil seal washer 58 is maintained stationary by an outward extension 59, which engages in a groove 60 in the otherwise cylindrical funnel 54. A rubber-like bellows construction 61, spread outwardly by compression spring 61a, is provided for the washer 58.

The rotatable sleeve 48, which extends from the casing 18, has secured thereto, as by welding, a driven clutch member or disk 62, having frictional material 63. The axially movable rotatable driving shaft 19 is mounted within the rotatable sleeve 48. It is spring pressed upwardly by a compression spring 65, which bears against the extension 52, of ring 51, and a bearing nut 66 at the upper end of shaft 19. The shaft 19 is provided with the combined driving clutch member and pulley 20. When the shaft 19 is moved upwardly, by operation of spring 65, the clutch members engage to cause rotation of the beveled gears 41 and 35 and cause reciprocation of the shaft 17.

Manually movable means are provided for moving the shaft 19 downwardly. This may take the form of a cam shaft 70 rotatable about a bearing 71 in casing 18, and is provided with a reduced end or cam 72 which bears against the end of the shaft 19. A handle 73 is provided. When the shaft 70 is rotated from the position shown in Figure 2 the shaft 19 moves upwardly for engagement of the clutch members 62 and 20. The cam shaft 70 is axially keyed at 68.

The tub 15 may be provided with a drain pipe 90 leading to a pump 91 in the lower end of motor 22 which discharges through pipe 92 to a hose and house drain, not shown.

The transmission casing 18 may be supported by a plurality of supporting rods 93 bolted or welded to the cabinet 10, and supporting the outwardly directed flange 94 of the casing 18, to which the rods 93 are secured by means of the bolts 95. If desired, an access opening 96 may be closed by a plate 97 held in place by screws or bolts 98.

In the operation of the device, clothes and liquid may be placed in the tub 15 to the proper level. The motor 22 may be started by plugging in the connector line, not shown, or by closing a switch, not shown. The agitator may be started by turning the handle 73 from the position shown in Figures 1 and 2, to allow the shaft 19 to move axially upward under impulse of the resiliency of spring 65. This causes the clutch members 63 and 20 to engage, thus causing rotation of the sleeve 48 and beveled gear 41. This in turn rotates the beveled gear 35 which causes vertical reciprocation of the shaft 17 and agitator 16 by virtue of the Scotch-yoke construction including cylinders 32, 33, and pin 34. After agitation has been completed, the handle 73 is returned to the position of Figures 1 and 2, to stop the agitator 16, by disengaging the clutch members 63 and 20. The wringer 24 may be then set into operation by manipulating the one or more handles 31 which orients the wringer at the desired position and causes rotation of the wringer rolls, as is well-known.

While the form of embodiment of the invention as herein disclosed constitutes a preferred form, it is to be understood that other forms might be adopted, as may come within the scope of the claims which follow.

What is claimed is as follows:

1. A machine of the character described comprising: a rotary-back and forth motion converting means; a back and forth shaft extending from, and driven by, said converting means; a rotary drive member having an axis in the same direction as said shaft; a rotatable sleeve member coaxial with said drive member and extending into and driving said converting means; one of said members being axially movable; and a clutch between said drive member and sleeve member engageable and disengageable by axial movement of said one of said members.

2. A machine of the character described comprising: a rotary-reciprocating motion converting means; a reciprocable shaft extending from, and driven by, said converting means; a rotary drive member having an axis in the same direction as said shaft; a rotatable sleeve member coaxial with said drive member and extending into and driving said converting means; one of said members being axially movable; and a clutch between said drive member and sleeve member engageable and disengageable by axial movement by said one of said members.

3. A machine of the character described comprising: a rotary-reciprocating motion converting means; a reciprocable shaft extending from, and driven by, said converting means; a rotary drive member having an axis in the same direction as said shaft; a rotatable sleeve coaxial with said drive member and extending into and driving said converting means; said rotary drive member being axially movable; a driven clutch member on said sleeve; a driving clutch member on said rotary drive member; and means to move said rotary drive member axially to engage and disengage said clutch members.

4. A machine of the character described comprising: a rotary-reciprocating motion converting means; a reciprocable shaft extending from, and driven by, said converting means; a rotary drive member having an axis in the same direction as said shaft; a rotatable sleeve coaxial with said drive member and extending into and driving said converting means; spring means biasing said rotary drive member axially in one direction and said rotary drive member being axially movable against the resiliency of said spring; a driven clutch member on said sleeve; a driving clutch member on said rotary drive member; and means for moving said rotary drive member axially to engage and disengage said clutch members.

5. A machine of the character described comprising: a rotary-reciprocating motion converting means; a reciprocable shaft extending from, and driven by, said converting means; a rotary drive member having an axis in the same direction as said shaft; a rotatable sleeve coaxial with said drive member and extending into and driving said converting means; spring means biasing said rotary drive member axially in one direction and said rotary drive member being axially movable against the resiliency of said spring; a driven clutch member on said sleeve; a driving clutch member on said rotary drive member; and a manually operable cam moving said rotary drive member axially against the resiliency of said spring to engage and disengage said clutch members.

6. A machine of the character described comprising: a gear casing; a reciprocable shaft extending from said casing and having a transverse hollow cylinder within said casing; a beveled gear in said casing having a pin and slidable cylinder within said hollow cylinder; a hollow beveled gear meshing with said first named beveled gear and having a rotatable sleeve extending from said casing; a driven clutch member on said rotatable sleeve; an axially movable rotatable drive member coaxial with said rotatable sleeve and having a driving clutch member engageable with said driven clutch member; and means to move said rotatable drive member axially.

7. A machine of the character described comprising: a gear casing; a reciprocable shaft extending from said casing and having a transverse hollow cylinder within said casing; a beveled gear in said casing having a pin and slidable cylinder within said hollow cylinder; a hollow beveled gear meshing with said first named beveled gear and having a rotatable sleeve extending from said casing; a driven clutch member on said rotatable sleeve; an axially movable rotatable drive member coaxial with said rotatable sleeve and having a driving clutch member engageable with said driven clutch member; spring means tending to move said rotatable drive member axially in one direction; and a manually operable cam for moving said rotatable drive member axially in the other direction.

8. A machine of the character described comprising: a gear casing; a reciprocable shaft extending from said casing and having a transverse hollow cylinder within said casing; a beveled gear in said casing having a pin and slidable cylinder within said hollow cylinder; a hollow beveled gear meshing with said first named beveled gear and having a rotatable sleeve extending from said casing; a driven clutch member on said rotatable sleeve; an axially movable rotatable drive member coaxial with said rotatable sleeve and having a driving clutch member engageable with said driven clutch member; means to move said rotatable drive member axially; and an electric motor having a belt drive with said rotatable drive member.

9. A machine of the character described comprising a rotary back and forth motion converting means, a back and forth shaft extending from and driven by said converting means, a rotary drive member having an axis in the same direction as said shaft, a rotatable driven member coaxial with said drive member and extending into and driving said converting means, and clutch means for connecting and disconnecting said rotary drive member and said rotatable driven member.

10. A machine of the character described comprising a rotary back and forth motion converting means, a back and forth shaft extending from and driven by said converting means, a rotary drive member having an axis in the same direction as said shaft, connecting means for connecting said rotary drive member and said motion converting means, and clutch means coaxially arranged relative to said rotary drive member and said back and forth shaft for controlling the operation of said motion converting means.

KENDALL CLARK.

REFERENCES CITED

The following references are of record in the file of this patent:

UNITED STATES PATENTS

| Number | Name | Date |
| --- | --- | --- |
| 235,905 | Schultz | Dec. 28, 1880 |
| 788,811 | Andree | May 2, 1905 |
| 968,437 | Wellman | Aug. 23, 1910 |
| 1,323,536 | McDaniel | Dec. 2, 1919 |
| 2,096,979 | Schjolin | Oct. 26, 1937 |
| 2,251,564 | Conterman | Aug. 5, 1941 |
| 2,340,365 | Cain | Feb. 1, 1944 |
| 2,392,652 | Dyer | Jan. 8, 1946 |
| 2,397,873 | Kuhn | Apr. 2, 1946 |
| 2,398,716 | Ojutkangas | Apr. 16, 1946 |